United States Patent [19]
Johnson

[11] 3,861,830
[45] Jan. 21, 1975

[54] PRESSURE DIFFERENTIAL PUMPING SYSTEM FOR DRY BULK PRODUCTS

[76] Inventor: Ronald D. Johnson, 3516 W. 97th Pl., Leawood, Kans. 66208

[22] Filed: Sept. 17, 1973

[21] Appl. No.: 397,681

[52] U.S. Cl................. 417/149, 222/193, 302/53
[51] Int. Cl.............................................. F04f 1/02
[58] Field of Search .......... 222/152, 193, 335, 373, 222/383; 717/148, 149, 182, 187; 251/63.5; 302/53, 52, 56, 36

[56] References Cited
UNITED STATES PATENTS
| | | | |
|---|---|---|---|
| 2,616,766 | 11/1952 | Sanborn et al. | 302/53 |
| 3,372,958 | 3/1968 | Black | 222/193 X |

Primary Examiner—Robert B. Reeves
Assistant Examiner—Larry H. Martin
Attorney, Agent, or Firm—Schmidt, Johnson, Hovey & Williams

[57] ABSTRACT

A pressure differential pumping system for dry bulk products draws a supply of products into a vessel during the suction cycle of the system and then forces the supply out of the vessel into a pneumatic conveying line during the discharge cycle so as to completely transfer a load of products from one location to another during repeated cycles. A control valve assembly adjacent the vessel and in communication therewith alternately draws a vacuum on the vessel and produces a positive pressure air discharge thereinto during the cycles of operation. The special valve assembly includes a venturi through which a primary airstream is continuously directed so that a secondary airstream may be produced during the suction cycle of the system when a reciprocating valve member is at one end of its path of travel. When the member is at the opposite end of its path of travel, the secondary airstream is terminated and the positive pressure discharge cycle is begun. The stroke of the reciprocating valve member can be varied so that a modulating airstream, in addition to the primary airstream, may pass through the venturi during the discharge cycle in order to dilute the conveying line with additional air and thus avoid product jamming. A particle separator coupled with the system between the valve assembly and the vessel removes abrasive particles from the secondary airstream during the suction cycle and projects the collected particles directly into the conveying line during the discharge cycle.

9 Claims, 4 Drawing Figures

PATENTED JAN 21 1975

PRESSURE DIFFERENTIAL PUMPING SYSTEM FOR DRY BULK PRODUCTS

This invention relates to the pneumatic conveying of bulk products such as cement, flour, and pelletized materials from one location, such as a railcar, to a second location such as a storage silo. An example of a system for carrying out this type of operation is found in U.S. Pat. No. 3,372,958, issued to Black, on Mar. 12, 1968.

Conveying systems of the type illustrated in the Black patent utilize a relatively small capacity pressure vessel which is alternately subjected to suction pressure to draw a vacuum on the vessel and positive discharge pressure to force products from the vessel that have been drawn thereinto during the suction action. These two cycles are repeated many times over, filling and discharging the vessel until the entire load of products has been fully transferred. During the discharge cycle the products leaving the vessel are moved through a pneumatic conveying line leading from the vessel to the final storage location for the products.

In order for such systems to produce the alternating discharge and vacuum cycles, a venturi is relied upon to intermittently produce a secondary suction airstream in response to a primary stream of air being directed therethrough. However, the valving arrangement associated with the venturi in a system of the aforementioned type is unduly complicated, and because of its reliance upon an excessive number of components, is subject to frequent mechanical problems and high production costs.

Moreover, systems of this type encounter difficulty when products are to be conveyed in excess of approximately 100 feet because of periodic jamming of the main pneumatic conveying line. This problem is accentuated when the products being conveyed over the greater distances are pelletized rather than pulverulent in nature.

Additionally, such systems have heretofore lacked efficient means for removing abrasive particulate matter from the secondary airstream that is induced in the system during the suction cycle thereof. This contributed to excessive wear on the component parts of the system, especially the venturi and its associated valves, hence significantly reducing the useful operating lives of such systems.

Accordingly, one important object of the present invention is to provide an improved control valve assembly for use in a pumping system of the character hereinabove described which is of significantly simplified design, yet is highly efficient and reliable, requiring little maintenance and infrequent replacement of parts.

Another important object of this invention is to provide a control valve assembly as set forth above which is capable of modulation so as to permit the introduction of diluting air into the conveying line during the changeover between the suction cycle and the discharge cycle of the system so as to alleviate the tendency for the products to jam in the conveying line at this time.

Pursuant to the foregoing object, it is an important aim of this invention to provide a pumping system of the character described which is highly efficient over long distances in excess of 100 feet and for all types of fungible products.

A further important object of this invention is to provide means for removing particles from the secondary airstream during the suction cycle so as to avoid wear of the venturi and its associated components, and to prevent reintroduction of the removed particles into the system during the discharge cycle thereof.

Figure 1:
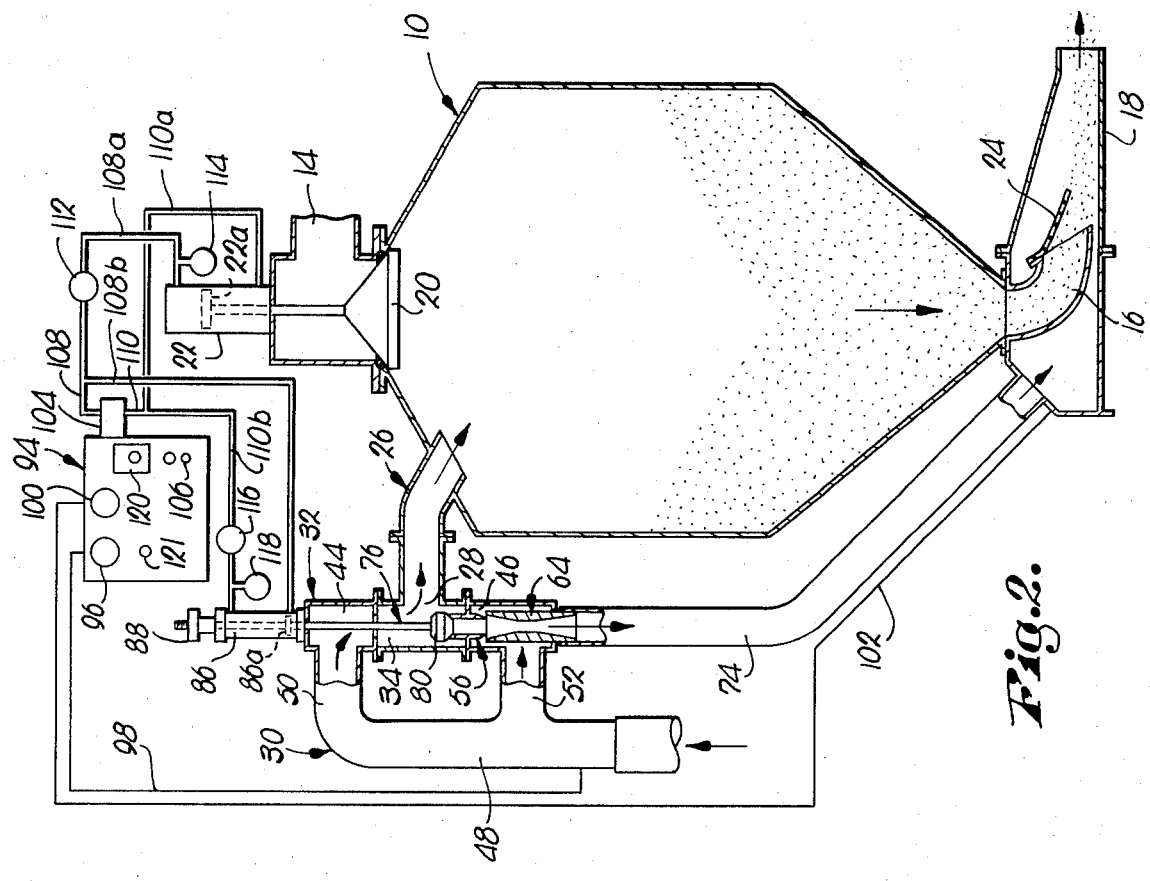
FIG. 1 is a schematic view of a pressure differential pumping system for dry bulk products constructed in accordance with the principles of the present invention, the system being illustrated in its suction cycle of operation.

A vessel 10 for intermittently holding a relatively small supply of the total volume of products being transferred, has an inlet 12 at its upper end coupled with a product supply line 14, and an elbow-shaped outlet 16 at the bottom thereof that projects into a main conveying line 18 leading to a remote transfer point. A cone valve 20 controls inlet 12 and is operated by an air cylinder 22 for reciprocation between the two positions illustrated in FIGS. 1 and 2. At the other extreme, a flexible flap valve 24 is disposed in covering relationship to outlet 16 and is responsive to the changes of pressure within vessel 10 to shift between the two positions illustrated in FIGS. 1 and 2.

The vessel 10 has a conduit 26 leading therefrom adjacent the top thereof that is in open communication with the interior of vessel 10. That end of conduit 26 most remote from vessel 10 terminates in a port 28 that is coupled with a control valve broadly designated by the numeral 30 and illustrated in detail in FIG. 3.

The assembly 30 includes an elongated, normally upright housing 32 having an internal valve chamber 34 that is defined between two laterally extending partitions 36 and 38 which are spaced apart vertically from one another and are each spaced from the respective upper and lower ends 40 and 42 of housing 32. A pair of manifolds 44 are thus defined between the partition 36 and end 40 and between the partition 38 and end 42 respectively. A tube 48 alongside of housing 32 leads to a source of pressurized air (not shown) and has an upper branch 50 communicating with upper manifold 44, and a lower branch 52 communicating with lower manifold 46.

The partition 36 has an inlet opening 54 therethrough which communicates manifold 44 with chamber 34, the periphery of inlet 54 being chamfered so as to provide a valve seat as hereinafter further described. A tubular outlet air jet 56 is supported by partition 38 in coaxial alignment with inlet 54, having an upper open end 58 that projects into chamber 34, and a lower open end 60 that projects into manifold 46. As shown best in FIG. 1, the upper end 58 of jet 56 is internally chamfered to provide a second valve seat in opposition to that associated with inlet 54, while the lower end 60 of jet 56 is externally beveled to impart a slightly tapered configuration to the exterior of jet 56 at end 60.

An internally threaded, tubular mount 62 supported in lower end 42 of housing 32 threadably receives venturi structure 64 having a constricted throat 66 and flared, opposed termini 68 and 70. The structure 64 is coaxially aligned with jet 56, and the upper terminus 68 receives the lower end 60 of jet 56 in radially spaced relationship so as to define an annular passage 72 therebetween that can be varied in size by rotating structure 64 to thread the same toward or away from jet 56. The lower terminus 70 of structure 64 is coupled with an air line 74 (FIGS. 1 and 2) that leads to conveying line 18 and is coupled with the latter behind outlet 16 as illustrated.

The valve assembly 30 further includes a reciprocable valve member 76 having an elongated stem 78 extending coaxially through inlet 54 and provided with a sealing component 80 at the lowermost end of stem 78. Component 80 is generally cylindrical, having opposed, truncated cone portions 82 and 84 on opposite upper and lower sides thereof that are complementally engageable with the inlet 54 and jet 56 respectively at opposite ends of the path of travel of component 80. The stem 78 also projects upwardly through and beyond upper end 40 of housing 32 into an air cylinder 86 for operation by the latter.

The uppermost extremity 78a of stem 78 is threaded to receive a suitable adjusting device 88 which may be in the nature of a knurled knob. The device 88 has a lower end 90 that may engage an abutment 92 on air cylinder 86 to serve as a means for limiting the downstroke of valve member 76. By varying the position of device 88 along threaded extremity 78a, the position of component 80 with respect to jet 56 when valve member 76 is at the lower limit of its stroke can be varied for purposes of modulating the airflow through jet 56 as hereinafter explained in detail.

The controls for actuating the system include a console 94 that is coupled with a source of pressurized air for purposes of operating the various components of the system, the console 94 also including a wiring network that does not directly form a part of the present invention. A first gauge 96 is coupled with supply tube 48 via a sensing line 98 to display pressure within tube 48, and a second gauge 100 is coupled with the main conveying line 18 via a sensing line 102 to display the pressure within conveying line 18 at console 94. The console 94 is also provided with a commercially available solenoid valve 104 of conventional design that is controlled by a switch 106 for directing pressurized air from console 94 alternately into a line 108 utilized during the suction cycle of the system, and a line 110 utilized during the discharge cycle of the system.

Line 108 has a first branch 108a that is coupled with air cylinder 22 of cone valve 20 above the operating piston 22a of cylinder 22, the branch line 108a having in series a flow control valve 112 and an accumulator 114 upstream from cylinder 22 for momentarily preventing the flow of pressurized air into the latter. The other branch 108b of line 108 leads to the air cylinder 86 for valve member 76 and is coupled with cylinder 86 below the operating piston 86a thereof. No flow delay devices are utilized in branch 108b so that when pressurized air is supplied to line 108, it immediately rushes to cylinder 86, but is delayed in its movement to cylinder 22.

The second line 110 leading from solenoid valve 104 also has a pair of branch lines 110a and 110b, the branch line 110a leading directly to cylinder 22 below piston 22a thereof without any flow delay devices. On the other hand, branch line 110b leads to cylinder 86 above piston 86a thereof and has a flow delay valve 116 and an accumulator 118 coupled in series upstream from cylinder 86 to momentarily delay actuation of piston 86a. A timer 120 or other means of automation may be provided at the console 94 for terminating the energization of solenoid valve 104 after a predetermined amount of time has elapsed following energizing of solenoid 104. Thus, timer 120 terminates the suction cycle of the system. A pressure-responsive switch 121 below gauge 96 serves to re-energize solenoid 104 at the completion of the discharge cycle of the system, when line pressure in conveying line 18 drops to less than 3 psi.

OPERATION

It is contemplated that air will be supplied through tube 48 to the system at approximately 15 psi, although this figure is not necessarily critical to the successful operation of the system. For purposes of illustration, however, the description of the operation which follows will assume that air at 15 psi is being supplied through tube 48.

With air circulating through tube 48 into valve assembly 30, operation of the switch 106 causes the solenoid valve 104 to energize, thus supplying pressurized air to line 108 and it branches 108a and 108b. The valve member 76 is thus immediately shifted to its upper limit of travel as illustrated in FIG. 1, wherein the upper cone portion 82 of component 80 seats within inlet 54 to tightly close the latter. Thus, all of the air moving through tube 48 is directed into lower manifold 46 through lower branch 52 to enter venturi structure 64 through the passage 72 in the form of a primary stream of air. Such primary stream exits venturi structure 64 through air line 74 and enters main conveying line 18 as illustrated. The movement of the primary airstream through venturi structure 64 induces a secondary airstream that originates in vessel 10 and flows through conduit 26, port 28, and into jet 56 for mergence with the primary airstream in venturi structure 64. Thus, a vacuum is drawn on the interior of vessel 10 by the secondary stream moving through conduit 26 to prepare vessel 10 for receiving a supply of products through line 14.

Because of the delay in having pressurized air reach cylinder 22 as a result of the delay valve 112 and the accumulator 114 in branch line 108, the vacuum begins to be drawn on vessel 10 before the cone valve 20 is opened. Once the pressurized air reaches cylinder 22 above piston 22a thereof, the cone valve 20 is forced downwardly to its open position illustrated in FIG. 1, whereupon the products within line 14 rush into vessel 10 to fill the vacuum created therein. It is also important to note that as soon as the secondary stream through conduit 26 begins to draw a vacuum on vessel 10, the flap valve 24 at outlet 16 closes so as to allow the formation of the vacuum within vessel 10.

The vacuum cycle continues for a certain amount of time as determined by the timer 120 or other means of automation. It is important to note that the secondary stream continues to flow from vessel 10 through conduit 26 during the full period that vessel 10 is being loaded and thus the air pressure within vessel 10 can be maintained at approximately 10 inches of mercury during the loading procedure. The pressure within line 74 leading from venturi structure 64 to conveying line 18, is below 3 psi at this time.

Figure 2:
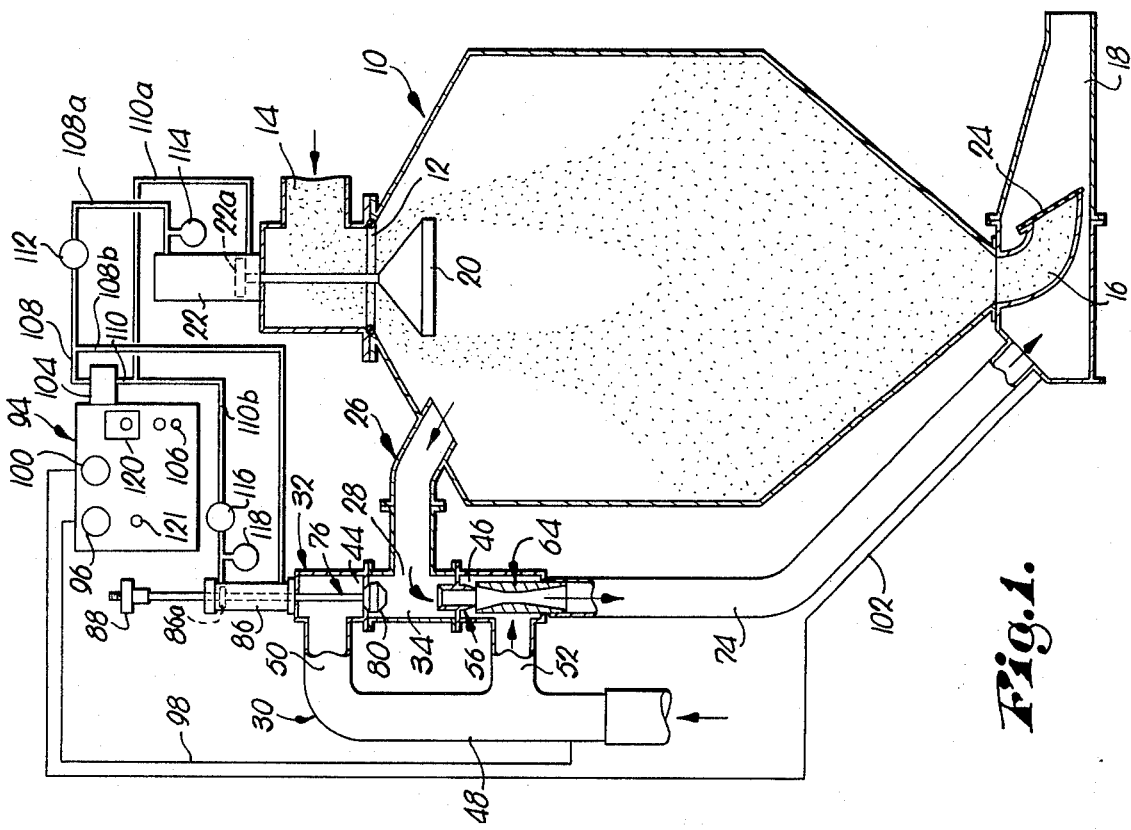
FIG. 2 is a schematic view similar to FIG. 1 showing the system during the discharge cycle of operation.

When the vessel 10 is filled to the desired level, the solenoid 104 is deactivated to close line 108 and to open line 110. Air pressure immediately rushes to cylinder 22 through branch line 110a to close cone valve 20, while the air moving to cylinder 86 is delayed by flow control valve 116 and accumulator 118 thereby assuring that cone valve 20 is fully closed before the discharge cycle is initiated. When the air pressure reaches cylinder 86, it operates against piston 86a to push valve member 76 downwardly away from inlet 54 so as to open the latter to pressurized airflow as illustrated in FIG. 2. Thus, a burst of pressurized air enters the vessel 10 and abruptly pushes the supply of products out of the latter through outlet 16 into conveying line 18, forcing the flap valve 24 to open in the process.

Figure 3:
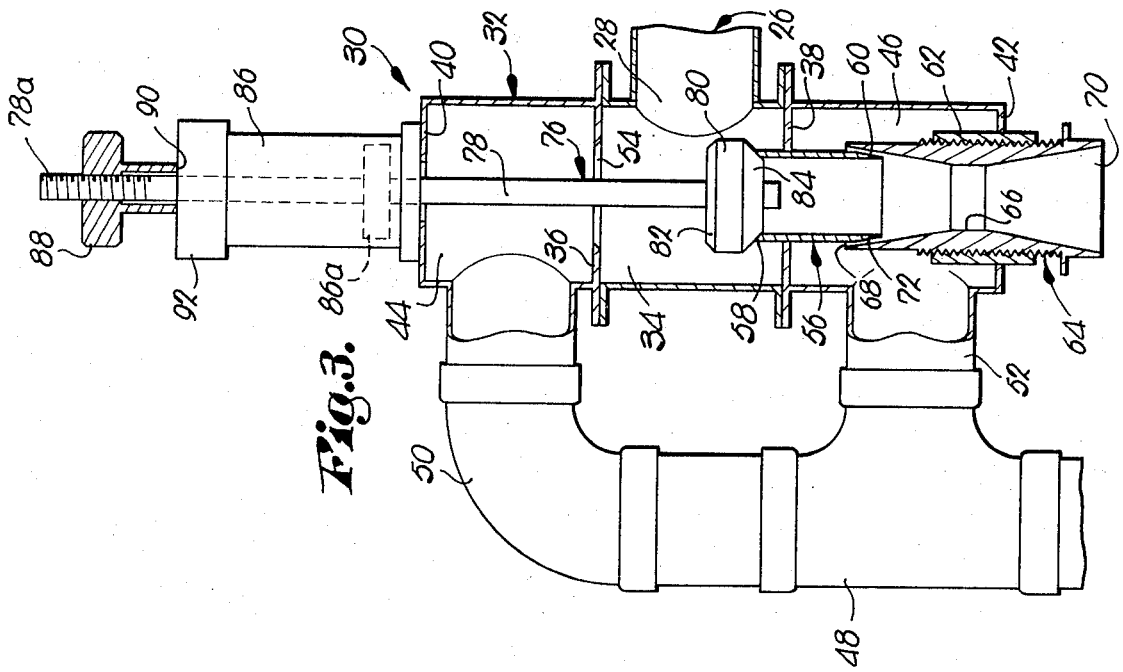
FIG. 3 is an enlarged, fragmentary view of the pumping assembly of the system, shown partially in cross-section and partially in elevation.

When the inlet 54 is opened during the discharge cycle of the system, the jet 56 may or may not have movement of air therethrough, depending upon the final position of the valve component 80 with regard to jet 56 when valve member 76 is at the lower end of its stroke. If the adjusting device 88 is so positioned on the threaded extremity 78a of stem 78 to allow lower cone portion 84 of component 80 to fully seat against jet 56 during the discharge cycle, then no air can flow through jet 56 into venturi structure 64. Such a condition is illustrated in FIGS. 2 and 3.

However, depending upon the particular type of products being conveyed, it may be desirable to inject an additional amount of air into the line 74 leading to conveying line 18 at this point in the operation of the system. Where pelletized products, for example, are being conveyed, there is a tendency for such products to jam within line 18 immediately following their discharge from outlet 16. Such jamming is caused by the instantaneous changeover in pressure between the vessel 10 and line 74 during the switch from the suction cycle to the discharge cycle. The pressure within vessel 10 can jump from 10 inches of mercury to 14 psi quickly, while the pressure within line 74 may not change as rapidly from less than 3 psi to approximately 13 psi, thus causing the products within vessel 10 to surge out of outlet 16 more rapidly than they can be handled by the conveying airstream within line 18.

Accordingly, it is quite helpful where products of this type are involved and where substantially long distances are encountered, to be able to introduce "diluting" air to the line 18 during the time that the pressure in vessel 10 instantaneously changes from its vacuum pressure to its discharge pressure. This is accomplished by setting the adjusting device 88 at such a position along stem 78 that the valve component 80 is not allowed to fully seat against jet 56 when valve member 76 is at its lower limit of travel. Thus, in addition to the discharging stream of air as shown in FIG. 2 that passes through inlet 54 and into vessel 10 through conduit 26, some air from manifold 44 passes downwardly through chamber 34 and directly into jet 56 for passage through venturi structure 64 into the line 74. Thus, during the time that the pressure within vessel 10 abruptly rises, diluting air continues to be channelled through jet 56 and subsequently into line 18 behind outlet 16 to increase the amount of air within conveying line 18 thus avoiding product jamming.

It is to be noted that the adjusting device 88 can be finely set by virtue of its threaded engagement with stem extremity 78a thereby giving accurate control over the amount of diluting air that enters jet 56 during the discharge cycle of the system. The diluting air can thus be modulated in accordance with the particular characteristics of the products being conveyed, and such is important inasmuch as bulk products can differ significantly in their conveying characteristics.

The principle of modulating diluting air at the source thereof in valve assembly 30 rather than attempting to prevent jam-up by controlling the extent of swinging of the flap valve 24 is important because such an arrangement allows the system to work rapidly without diminishing the volume of product transfer per unit of time. Previous conveying systems have attempted to prevent jam-up in line 18 by varying the extent to which flap 24 can open during the discharge cycle, but this is not satisfactory because, by so doing, the amount of products issuing from outlet 16 per unit of time can be significantly reduced. Hence, the total amount of time required to complete the transfer of the products from one location to another can be significantly prolonged. By simply adding greater or lesser amounts of diluting air to conveying line 18 as determined by the position of valve member 76 with respect to jet 56, the valve flap 24 can be fully opened during the discharge cycle to release the full amount of products capable of being carried by outlet 16. Thus, even where somewhat difficult-to-handle products are involved, conveying thereof can be carried out rapidly and with a minimum of tendency to jam-up.

The discharge cycle continues until the products have been fully projected from vessel 10 and line 18 has cleared sufficiently to lower the pressure thereof from approximately 13 psi down to 3 psi or less. This condition is sensed by pressure-responsive switch 121 which re-energizes the solenoid 104 and resets the timer 120 to initiate the next suction cycle. Energization of solenoid 104 causes the air cylinder 86 to be immediately actuated so as to raise valve member 76 to close inlet 54, whereupon after a short delay to draw a partial vacuum on vessel 10 and to close flap valve 24, the cone valve 20 is opened to admit products into vessel 10. The suction cycle continues in the manner above described and both the suction and discharge cycles are repeated alternately until the complete load of products has been fully transferred.

Figure 4:
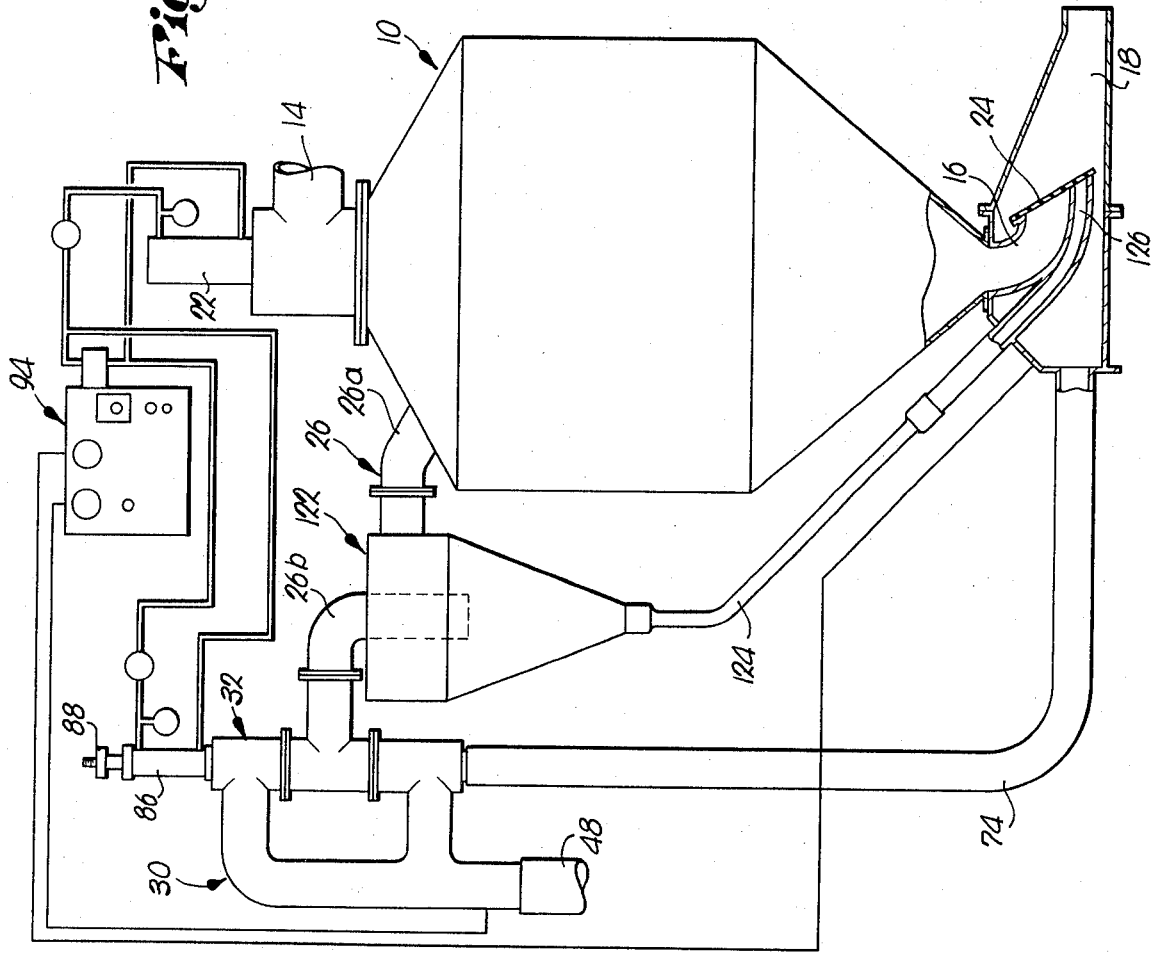
FIG. 4 is a schematic view of an alternative form of the system in which a particle separator is employed between the pumping assembly and the pressure vessel.

FIG. 4 shows the addition of a cyclone separator 122 to the system between valve assembly 30 and vessel 10 in communication with conduit 26. One section 26a of conduit 26 enters separator 122 tangentially thereof adjacent its top and is connected directly to the vessel 10. Another section 26b of conduit 26 projects axially downwardly into separator 122 for a distance beyond the point of entry of section 26a. The opposite end of section 26b is coupled with housing 32 in the same manner as earlier described. A restricted exit line 124 leads from the funneled bottom of separator 122 into main conveying line 18 and terminates directly below outlet 16 in a discharge terminus 126. The flap 24 is enlarged slightly so as to cover both outlet 16 and discharge terminus 126 for valving purposes.

The separator 122 is utilized during the suction cycle of the system to remove abrasive particles or dust from the secondary airstream that flows through conduit 26 into valve assembly 30. As the secondary stream tangentially enters cylindrical separator 122 it is swirled therewith in a cyclonic manner, causing the particles to be projected radially outwardly by centrifugal force and to drop from the stream by gravity to the bottom of separator 122. The cleaned secondary stream then enters conduit section 26b and continues its flow into valve assembly 30.

During the discharge cycle of the system the positive pressure air flowing in the reverse direction through conduit 26 serves to project the collected particles from separator 122, through exit line 124 and into conveying line 18. Because of the restricted nature of exit line 124 as compared to conduit section 26a, only a small portion of the discharge blast of air flows through exit line 124, the bulk thereof moving into vessel 10 through conduit section 26a to push the products from vessel 10.

It is to be noted that the use of the common flap valve 24 for both outlet 16 and discharge terminus 126 significantly simplifies controlling exit line 124. Such an arrangement can be utilized inasmuch as the vessel 10 and separator 122 operate with the same directional airflow with respect to each other during both the suction cycle and the discharge cycle of the system.

Having thus described the invention, what is claimed as new and desired to be secured by Letters Patent is:

1. In a pressure-differential pumping system for dry bulk products, a control valve assembly including:
   means defining a valve chamber;
   inlet means for introducing pressurized air into said chamber;
   outlet means for withdrawing air from said chamber;
   port means between said inlet and outlet means in communication with said chamber;
   venturi structure communicating with said outlet means;
   means for forcing a primary stream of air through said chamber to create a secondary airstream flowing from said port through said outlet means and merging with said primary stream; and
   a valve member reciprocable within said chamber for alternately causing suction intake and positive discharge through said port means,
   said member being reciprocable between a first position closing said inlet means to cause said suction intake as a result of the induced secondary airstream through said outlet means, and a second position opening said inlet means to cause said positive discharge as a result of airflow from said inlet means through said port means.

2. A control valve assembly as claimed in claim 1, wherein said outlet means includes an air jet having one end thereof projecting into said structure axially thereof.

3. A control valve assembly as claimed in claim 2, wherein the opposite end of said jet is provided with a valve seat for said member for closing the jet to said port means when the member is against said seat.

4. A control valve assembly as claimed in claim 3, wherein said inlet means includes a second seat for said member for closing said port means to said inlet means when the member is against said second seat.

5. A control valve assembly as claimed in claim 3, wherein said means for forcing a primary airstream through said structure includes an intake manifold surrounding said structure and said jet for forcing said primary stream into the structure between the latter and said jet.

6. A control valve assembly as claimed in claim 3, wherein said jet, said venturi structure, and the path of reciprocation of said member are coaxial.

7. A control valve assembly as claimed in claim 1, wherein said assembly further includes apparatus for varying said second position of the member with respect to said outlet means to permit modulation of airflow through said outlet means when said inlet means is open.

8. A control valve assembly as claimed in claim 7, wherein said member includes an elongated stem, said apparatus including a device movable with said stem but selectively shiftable therealong and stationary abutment means disposed in the path of travel of said device.

9. A control valve assembly as claimed in claim 7, wherein said outlet means includes an air jet having one end thereof projecting into said structure and the opposite end thereof provided with a valve seat for said member.

* * * * *